United States Patent [19]

Cooper et al.

[11] Patent Number: 4,698,761
[45] Date of Patent: Oct. 6, 1987

[54] AUTOMATIC TUNNEL DETECTOR FOR A SELF-PROPELLED TRACTION VEHICLE

[75] Inventors: Charles E. Cooper; Glenn E. Vest, both of Erie, Pa.

[73] Assignee: General Electric Company, Erie, Pa.

[21] Appl. No.: 714,581

[22] Filed: Mar. 21, 1985

[51] Int. Cl.$^4$ .............................................. G06F 15/04
[52] U.S. Cl. ................................ 364/424; 123/198 D; 123/198 DB; 364/431.01
[58] Field of Search .................... 123/357, 359, 198 D, 123/198 DB; 364/424, 431.01; 105/62 R

[56] References Cited

U.S. PATENT DOCUMENTS

3,738,346  6/1973  Goodman ................... 123/198 DB
3,851,469 12/1974  Eichler et al. ............. 123/198 DB
4,413,595 11/1983  Potts, Jr. ..................... 123/198 D
4,485,781 12/1984  Barnes ......................... 123/198 D
4,512,307  4/1985  Igashira et al. ............. 123/198 DB Primary Examiner—Parshotam S. Lall
Attorney, Agent, or Firm—Albert S. Richardson, Jr.

[57] ABSTRACT

The propulsion control system of a diesel-electric locomotive includes means responsive to the respective temperatures of the coolant and the lubricant of the locomotive engine for automatically indicating that the locomotive is in a tunnel if the coolant temperature exceeds an abnormally high magnitude and is higher than a variable reference level that depends on the lubricant temperature. When a tunnel is thus detected, the conventional overtemperature-responsive deration function of the propulsion control system is temporarily suppressed until the coolant temperature rises to a threshold that is higher than the preset overtemperature threshold at which deration is normally initiated.

11 Claims, 8 Drawing Figures

AUTOMATIC TUNNEL DETECTOR FOR A SELF-PROPELLED TRACTION VEHICLE

BACKGROUND OF THE INVENTION

This invention relates generally to traction vehicles such as locomotives that have thermal prime movers on board, and it relates more particularly to means for automatically detecting the presence of a locomotive inside a tunnel.

Large self-propelled traction vehicles such as locomotives commonly use a thermal prime mover to drive an electrical transmission comprising generating means for supplying electric current to a plurality of direct current (d-c) traction motors whose rotors are drivingly coupled through speed-reducing gearing to the respective axle-wheel sets of the vehicle. The generating means typically comprises a main 3-phase traction alternator whose rotor is mechanically coupled to the output shaft of the prime mover (typically a 16-cylinder turbocharged diesel engine). When excitation current is supplied to field windings on the rotating rotor, alternating voltages are generated in the 3-phase stator windings of the alternator. These voltages are rectified and applied to the armature windings of the traction motors.

During the "motoring" or propulsion mode of operation, a locomotive diesel engine tends to deliver constant power, depending on throttle setting and ambient conditions, regardless of locomotive speed. For maximum performance, the electrical power output of the traction alternator must be suitably controlled so that the locomotive utilizes full engine power. For proper train handling, intermediate power output levels are provided to permit graduation from minimum to full output. But the load on the engine must not exceed whatever level of power the engine can develop. Overloads can cause premature wear, engine stalling or "bogging," or other undesirable effects. Historically, locomotive control systems have been designed so that the operator can select the desired level of traction power in discrete steps between zero and maximum, and so that the engine develops whatever level of power the traction and auxiliary loads demand.

Engine horsepower is proportional to the product of the angular velocity at which the crankshaft turns and the torque opposing such motion. For the purpose of varying and regulating the amount of available power, it is common practice to equip a locomotive engine with a speed regulating governor which adjusts the quantity of pressurized diesel fuel (i.e., fuel oil) injected into each of the engine cylinders so that the actual speed (RPM) of the crankshaft corresponds to a desired speed. The desired speed is set, within permissible limits, by a manually operated lever or handle of a throttle that can be selectively moved in eight steps or "notches" between a low power position (N1) and a maximum power position (N8). The throttle handle is part of the control console located in the operator's cab of the locomotive. (In addition to the eight conventional power notches, the handle has an "idle" position and a "shutdown" position).

The position of the throttle handle determines the engine speed setting of the associated governor. In a typical governor system, the output piston of an electrohydraulic device is drivingly connected, via a mechanical linkage, to a pair of movable fuel pump racks which in turn are coupled to a plurality of fuel injection pumps that respectively meter the amounts of fuel supplied to the power cylinders of the engine. The governor compares the desired speed (as commanded by the throttle) with the actual speed of the engine, and its output piston moves the fuel racks as necessary to minimize any deviation therebetween.

For each of its eight different speed settings, the engine is capable of developing a corresponding constant amount of horsepower (assuming maximum output torque). When the throttle notch 8 is selected, maximum speed (e.g., 1,050 rpm) and maximum rated gross horsepower (e.g., 4,000) are realized. Under normal conditions the engine power at each notch equals the power demanded by the electric propulsion system which is supplied by the engine-driven main alternator plus power consumed by certain electrically and mechanically driven auxiliary equipments.

The output power (KVA) of the main alternator is proportional to the product of the rms magnitudes of generated voltage and load current. The voltage magnitude varies with the rotational speed of the engine, and it is also a function of the magnitude of excitation current in the alternator field windings. For the purpose of accurately controlling and regulating the amount of power supplied to the electric load circuit, it is common practice to adjust the field strength of the traction alternator to compensate for load changes and minimize the error between actual and desired KVA. The desired power depends on the specific speed setting of the engine. Such excitation control will establish a balanced steady-state condition which results in a substantially constant, optimum electrical power output for each position of the throttle handle.

In practice the above-summarized system of controlling a diesel-electric locomotive also includes suitable means for overriding normal operation of the system and reducing engine load in response to certain temporary abnormal conditions, such as loss of wheel adhesion, low pressure in the lubricating oil system or the engine coolant system, or a load exceeding the power capability of the engine at whatever speed the throttle is commanding. This response, which is generally referred to as "deration," helps the locomotive recover from such conditions and/or prevents serious damage to the engine. In addition, the excitation control system conventionally includes means for limiting or reducing alternator output voltage as necessary to keep the magnitude of this voltage and the magnitude of load current from respectively exceeding predetermined safe maximum levels or limits. Current limit is effective when the locomotive is accelerating from rest. At low locomotive speeds, the traction motor armatures are rotating slowly, so their back emf is low. A low alternator voltage can now produce maximum load current which in turn produces the high tractive effort required for acceleration. On the other hand, the alternator voltage magnitude must be held constant at its maximum level whenever locomotive speed is high. At high speeds the traction motor armatures are rotating rapidly and have a high back emf, and the alternator voltage must then be high to produce the required load current.

One of the conditions that require deration of the locomotive propulsion system is excessive engine heat. If for any reason the engine cooling system were unable to function effectively and the engine were to become overheated, the locomotive control system responds to the resulting rise of temperature by reducing the traction load on the engine. In a typical prior art system this deration occurs when the temperature of the engine lubricating oil exceeds a predetermined overtemperature threshold (e.g., 235° F.), and it will reduce the load to a predetermined fraction (e.g., about ⅔) of normal for the selected throttle position. If the engine were even hotter, as indicated by either the temperature of the coolant exceeding the aforesaid threshold for a predetermined length of time or by the oil temperature attaining a higher level (e.g., 245° F.), all traction load is dropped and the engine is automatically returned to its idle speed regardless of the throttle position.

The above-summarized prior art temperature-responsive deration can be caused by unusually high ambient air temperature, even though there is no malfunction of the engine or its cooling system. Hot air reduces the engine-cooling effectiveness of the water-to-air heat exchangers (radiators) in the cooling system. Such a condition can occur when a locomotive is traversing a tunnel that is relatively long and not well ventilated. In a consist of two or more locomotives, the last one of the trail unit(s) is most likely to overheat because it passes through confined space preheated by the exhaust gases of each preceding unit. The resulting deration of one or more locomotives in a tunnel will adversely affect the performance of the derated locomotive(s), thereby undesirably increasing the running time and decreasing the productivity of the consist. Such deration is not really necessary so long as the engine and its various support systems are functioning properly and so long as the locomotive is not inside the tunnel too long. Ordinarily a locomotive propulsion system and its components have short-time ratings that appreciably exceed their ratings for continuous duty, and therefore the locomotive can safely endure overheating caused by a tunnel environment for at least a short term (e.g., under approximately ten minutes). Accordingly, when a locomotive engine is temporarily overheated because the locomotive is passing through a tunnel, it is both desirable and feasible to cancel or delay the normal temperature-responsive deration that is provided in prior art locomotive propulsion systems.

SUMMARY OF THE INVENTION

A general objective of the present invention is to provide means for automatically detecting the presence of a locomotive in a tunnel.

Another objective is the provision, on a diesel-electric locomotive, of means for temporarily suppressing the normal overtemperature deration function for the sake of improved locomotive performance while the locomotive is in a tunnel.

In carrying out the invention in one form, a locomotive is provided with a conventional propulsion system comprising a plurality of traction motors, means including a rotatable traction generator or alternator for supplying electric current to the traction motors, a thermal prime mover for driving the traction alternator, and controllable excitation means for supplying direct current to the alternator field. The prime mover is provided with speed control means responsive to a speed command signal for regulating its operating speed, and it has several other support systems, including a cooling system and a lubricating oil system that interface with one another in a lube oil cooler. The cooling system comprises the aforesaid oil cooler and a plurality of air-cooled radiators through which coolant can circulate when required. Air is blown across the radiators by associated variable-speed fans which are suitably controlled to maintain the coolant normally in a predetermined relatively stable temperature range (e.g., approximately 180°-200° F.). Under normal operating conditions, the lube oil is appreciably hotter than the coolant, with a typical temperature increment of approximately 10° to 25° F. A first temperature sensor located between the prime mover and the inlet of the radiators provides a signal representative of the temperature of the coolant, and a second temperature sensor located on the hot oil side of the lube oil cooler provides a signal representative of the temperature of the lubricating oil.

The aforesaid prime mover speed command signal is produced by a controller which in turn is connected to a manually operated multiposition throttle, whereby the value of the speed command signal normally varies with the selected position of the throttle. The controller also produces a signal that controls the aforesaid field excitation means which in turn controls the voltage magnitude and consequently the electric power output of the traction alternator. The value of this excitation control signal is a function of the throttle position or notch, whereby the traction power is normally determined by the throttle setting. The prime mover speed (horsepower) will track the traction load in accordance with a desired relationship between these quantities. However, in the abnormal event of overheating, traction load is automatically removed from the prime mover and the load-notch relationship deviates from normal. This deration of traction power is carried out in the controller. If either the coolant temperature (as detected by the first sensor) or the oil temperature (as detected by the second sensor) exceeds a predetermined overtemperature threshold, the controller is effective to reduce the excitation control signal as a function of the excess. The controller is arranged progressively to reduce the control signal from 100% of its normal throttle-dependent value to zero as the temperature of the coolant or the lube oil (whichever is hotter) increases from the aforesaid threshold to a level that exceeds the threshold by a predetermined delta (e.g., approximately 10° F.). Consequently, the power output of the traction alternator will decrease to zero as the degree of overheating increases within this limited range. The overtemperature threshold at which such deration normally becomes effective is preset at a first level (e.g., approximately 225° F.).

The controller includes means for automatically detecting when the locomotive is traveling on a section of the railroad tracks inside a tunnel. The tunnel detector is supplied with data from both the coolant temperature sensor and the lube oil temperature sensor. If the coolant temperature exceeds a predetermined magnitude (e.g., approximately 215° F.) and also is higher than a variable reference level determined by the lube oil temperature, the detector indicates that the locomotive is in a tunnel. In one practical embodiment of the invention, the reference level was made equal to the actual lube oil temperature, and after the locomotive entered a tunnel the coolant temperature rose to this level in approximately two minutes. Once the tunnel detector indicates that the locomotive is in a tunnel, the controller shifts the aforesaid overtemperature threshold to a second level (e.g., approximately 235° F.) which is higher than the first preset level at which deration is normally initiated. Consequently, before traction power is reduced while the locomotive is temporarily inside a tunnel, the prime mover is allowed to reach a higher temperature than is true outside the tunnel.

The invention will be better understood and its various objects and advantages will be more fully appreciated from the following description taken in conjunction with the accompanying drawings.

DESCRIPTION OF THE PREFERRED EMBODIMENT

Figure 1:
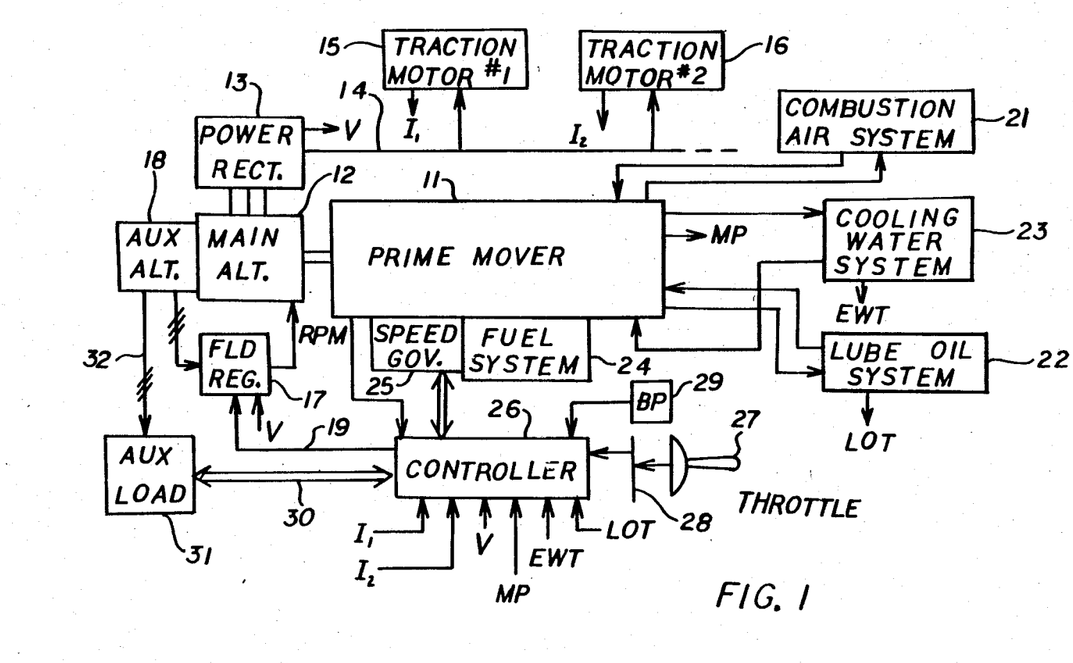
FIG. 1 is a schematic diagram of the principal components of a locomotive propulsion system, including a thermal prime mover (such as a diesel engine), a traction alternator, a plurality of traction motors, and a controller.

The propulsion system shown in FIG. 1 includes a variable-speed prime mover 11 mechanically coupled to the rotor of a dynamoelectric machine 12 comprising a 3-phase alternating current (a-c) synchronous generator, also referred to as the main traction alternator. The 3-phase voltages generated by the main alternator 12 are applied to a-c input terminals of at least one 3-phase, double-way uncontrolled power rectifier bridge 13. The rectified electric power output of the bridge 13 is supplied, via a d-c bus 14, to parallel-connected armature windings of a plurality of d-c traction motors, only two of which (15, 16) are identified in FIG. 1. In practice a traction motor is hung on each axle of the locomotive, there are usually two or three axles per truck, and there are two trucks per locomotive. The motors have field windings (not shown) connected in series with their respective armatures during the motoring or propulsion mode of operation. Alternatively, a-c traction motors could be used, in which case suitably controlled electric power inverters would be connected between the respective motors and the d-c bus 14.

Field windings (not shown) on the rotor of the main alternator 12 are connected for energization to the output of a suitable source 17 of regulated excitation current. Preferably the source 17 comprises a 3-phase controlled rectifier bridge the input terminals of which receive alternating voltages from a prime mover-driven auxiliary alternator 18 that can actually comprise an auxiliary set of 3-phase windings on the same frame as the main alternator 12. This source includes conventional means for varying the magnitude of the direct current that it supplies to the alternator field as necessary to minimize any magnitude difference between a control signal on an input line 19 and a feedback signal V representative of the average magnitude of the output voltage of the power rectifier 13. The latter voltage magnitude is a known function of the field current magnitude and also varies with the speed of the prime mover 11.

The prime mover 11 is a thermal or internal-combustion engine or equivalent. On a self-propelled diesel-electric locomotive, the motive power is typically provided by a high-horsepower, turbocharged, 4-stroke, 16-cylinder diesel engine. Such an engine has a number of ancillary systems that are represented by labeled blocks in FIG. 1. A combustion air system 21 conventionally includes an engine exhaust gas-driven turbocharger for compressing air in the combustion air intake manifold of the engine. A lube oil system 22 conventionally includes an engine crankshaft-driven pump and associated piping for supplying suitable lubricating oil to the various moving parts of the engine. A cooling water system 23 conventionally includes a pump for circulating relatively cool water from a plurality of air-cooled heat exchangers or radiators to a lube oil cooler, to the cylinder liners of the engine for absorbing heat rejected during the combustion process, and also to "intercoolers" through which the combustion air passes after being compressed (and therefore heated) by the turbocharger. These three systems (21–23) are illustrated in more detail in FIG. 2 which will soon be described.

A diesel engine fuel system 24 conventionally includes a fuel tank, fuel pumps and nozzles for injecting fuel oil into the respective power cylinders which are arranged in two rows or banks on opposite sides of the engine, tappet rods cooperating with fuel cams on a pair of camshafts for actuating the respective injectors at the proper times during each full turn of the crankshaft, and a pair of fuel pump racks for controlling how much fuel oil flows into a cylinder each time the associated injector is actuated. The position of each fuel pump rack, and hence the quantity of fuel that is being supplied to the engine, is controlled by an output piston of an engine speed governor system 25 to which both racks are linked. The governor regulates engine speed by automatically displacing the racks, within predetermined limits, in a direction and by an amount that minimizes any difference between actual and desired speeds of the engine crankshaft. The desired speed is set by a variable speed control signal received from a controller 26, which signal is herein called the speed command signal or the speed call signal.

In a normal motoring or propulsion mode of operation, the value of the engine speed call signal provided by the controller 26 is determined by the position of a handle 27 of a manually operated throttle to which the controller is coupled. A locomotive throttle conventionally has eight power positions or notches (N), plus idle and shutdown. N1 corresponds to a minimum desired engine speed (power), while N8 corresponds to maximum speed and full power. In a consist of two or more locomotives, only the lead unit is usually attended, and the controller on board each trail unit will receive, over a trainline 28, an encoded signal that indicates the throttle position selected by the operator in the lead unit.

As was explained hereinbefore, for each power level of the engine there is a corresponding desired load. The controller 26 is suitably arranged to translate the throttle notch information into a control signal of appropriate magnitude on the input line 19 of the alternator field regulator 17, whereby the traction power is regulated to match the called-for power so long as the alternator output voltage and load current are both within predetermined limits. For this purpose, and for the purpose of deration (i.e., unloading the engine) and/or limiting engine speed in the event of certain abnormal conditions, it is necessary to supply the controller 26 with information about various operating conditions and parameters of the propulsion system, including the engine and its support systems.

Figure 2:
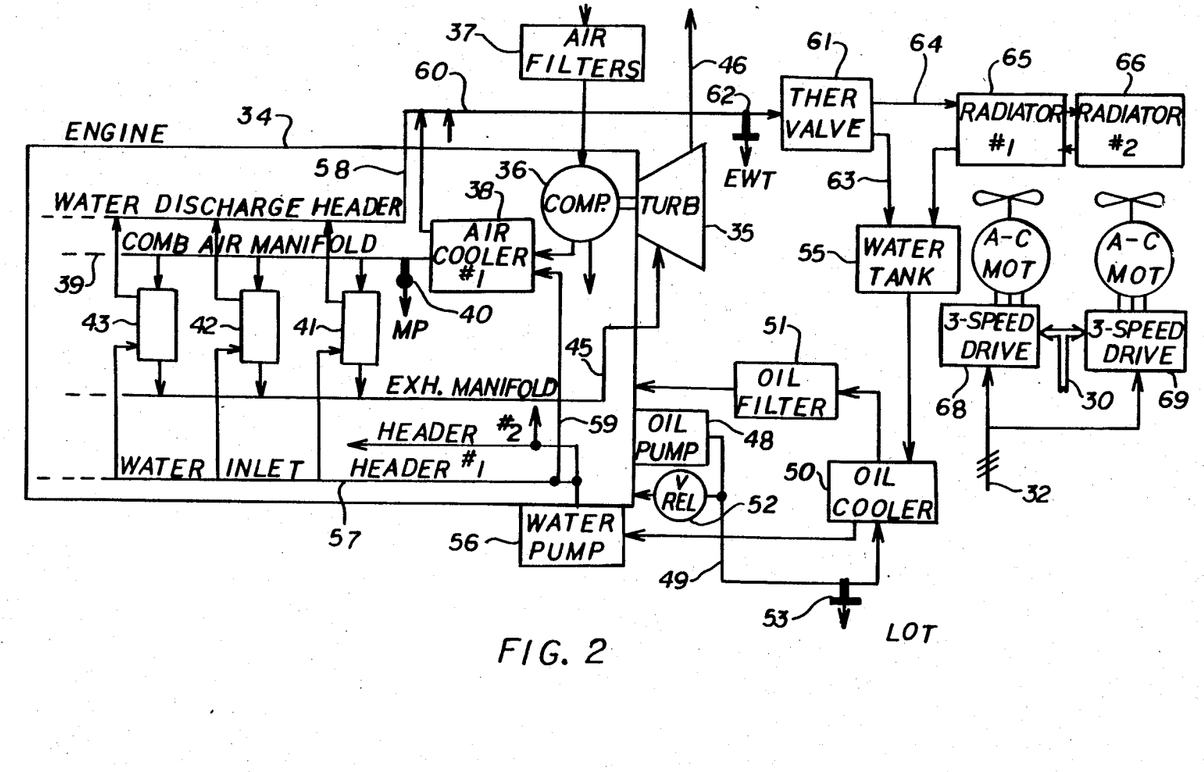
FIG. 2 is a simplified schematic diagram of the locomotive engine and the associated support systems that supply it with combustion air, lubricating oil, and cooling water.

More particularly, the controller 26 typically receives the voltage feedback signal V (representative of the average magnitude of the rectified alternator output voltage), current feedback signals I1, I2, etc. (representative, respectively, of the magnitude of current in the armature windings of the individual traction motors), and a load control signal issued by the governor system 25 if the engine cannot develop the power demanded and still maintain the called-for speed. (The load control signal is effective, when issued, to reduce the magnitude of the control signal on the line 19 so as to weaken the alternator field until a new balance point is reached.) In addition, as is illustrated in FIG. 1, the controller is supplied with an engine speed signal RPM indicating the rotational speed of the engine crankshaft, an ambient air pressure signal BP from a barometric pressure sensor 29, a combustion air pressure signal MP from a pressure sensor associated with an air intake manifold of the engine, an oil temperature signal LOT from a temperature sensor on the hot oil side of the lube oil cooler, and a water temperature signal EWT from a temperature sensor in a hot water section of the cooling water system 23. In response to the latter signal, the controller sends encoded speed control signals, via a multiline serial data link or bus 30, to radiator fan motor(s) that are part of auxiliary load equipment 31 connected for energization, via a 3-wire line 32, to a suitable source of a-c electric power (e.g., the engine-driven auxiliary alternator 18), whereby the flow of air across the heat exchange tubes of the radiators is controlled as a function of water temperature so as to maintain a relatively constant engine operating temperature over the load range of the engine and with wide variations in ambient temperature. FIG. 2 shows the cooling water and combustion air systems in more detail.

In FIG. 2 the diesel engine is represented by the block 34. At one end of the engine, opposite to the alternator end, the turbocharger in the combustion air system is mounted on the engine frame. The turbocharger comprises a gas turbine 35 the output shaft of which drives a centrifugal air compressor 36. Clean air is collected in a plenum, passed through an array of air filters 37, delivered to a central inlet of the compressor 36, and discharged (at elevated pressure and temperature) through alternative peripheral outlets on opposite sides of the engine. The compressed air that is discharged from each of the two outlets passes through an associated air-water heat exchanger (commonly referred to as either an intercooler or an aftercooler) and into a combustion air intake manifold. FIG. 2 shows only one air cooler 38 and one intake manifold 39 on the near side of the engine and does not show the duplicate cooler and the duplicate manifold that are conventionally disposed on the far side. A manifold pressure sensor 40 is connected to the intake manifold 39. From the manifold 39 the compressed air is supplied to a bank of power cylinders on the same side of the engine. While only three cylinders 41, 42, and 43 are shown, in practice each intake manifold supplies combustion air to eight cylinders of a 16-cylinder engine, or six cylinders of a 12-cylinder engine, or four cylinders of an 8-cylinder engine.

The gases produced during combustion are exhausted from each of the cylinders into an exhaust manifold 45. The exhaust gases drive the turbine 35 prior to their discharge through an exhaust stack 46 to the atmosphere. Turbine speed increases as the engine develops more power. With the engine running at or near full power, the compressor 36 is effective to compress the combustion air in the intake manifolds (39) to more than twice atmospheric pressure. The intercoolers (38) are then effective to lower the temperature of the compressed air (which was heated appreciably during the compression process), thereby improving thermal efficiency, reducing fuel consumption, and lowering the thermal loading of the engine.

In the lube oil system that is illustrated in FIG. 2, hot engine lubricating oil from the crankcase near the bottom of the engine 34 is pumped by an engine-driven pump 48 into a pipe 49 connected to the inlet of an oil-water heat exchanger 50, and cooled oil flows from 50 through an oil filter 51 and another pipe to an oil supply header (not shown). From the supply header within the main frame of the engine, the oil is distributed to various bearings, valves, pistons, gears, and other moving parts of the engine for lubricating and/or cooling purposes. A conventional pressure relief valve 52 connects the lube oil pipe 49 to the oil pan, and a temperature sensing device 53 is exposed to the oil flowing in the pipe 49 near the inlet of the oil cooler 50. Preferably the lube oil temperature sensor 53 comprises a conventional thermistor.

As is indicated in FIG. 2, the engine cooling water system comprises a water storage tank 55 from which relatively cool water flows, via heat exchange tubes inside the oil cooler 50, to the suction side of an engine-driven water pump 56. The pump raises the pressure of the water which then flows into a pair of inlet headers on opposite sides of the engine. Water in the first inlet header 57 passes in parallel through the individual cylinder jackets of the bank of cylinders on the near side of the engine to a common water discharge header 58 that is centrally located above the two banks of cylinders. The inlet and discharge headers 57 and 58 are also interconnected by a water branch comprising a pipe 59 and the case of the first combustion air cooler 38. A similar branch enables cooling water to flow from the second inlet header through the second intercooler (not shown) on the far side of the engine. The system is balanced hydraulically so that the flow rate to the two intercoolers is in the desired ratio to the flow rate to the cylinder jackets.

Hot water leaving the engine from the discharge header 58 flows through a pipe 60 to at least one thermostatically controlled bistable fluid valve 61. A temperature sensing device 62 (preferably another thermistor) is exposed to the water flowing in the pipe 60 near the inlet port of the valve 61. The valve 61 has two outlet ports that respectively communicate with two water channels 63 and 64. Whenever the temperature of the water entering the valve is lower than a predetermined threshold, or whenever the water pressure is lower than a predetermined level (i.e., whenever the engine speed is so low that the water pump 56 is unable to raise the water pressure to such a level), all of the water is diverted via the radiator bypass channel 63 to the storage tank 55. Otherwise the water flows into the channel 64 which feeds a bank of two or more water-air heat exchangers or radiators 65 and 66, and after being cooled in these radiators the water is discharged into the tank 55. In practice an additional bank of radiators (not shown), disposed in parallel with the illustrated bank, is connected to a second thermostatically controlled bistable fluid valve whose threshold temperature can differ slightly from that of the first valve 61. The radiators are disposed at a higher elevation than the storage tank 55, and water will quickly and completely drain from them after each cooling cycle. It should be noted here that if and when the radiators 65, 66 are bypassed due to insufficient water pressure (which in turn is due to the engine running at low speed, e.g., under 400 rpm), the water will be cooled while traversing the intercoolers (38) because the combustion air, being only moderately compressed when the turbocharger speed is low (as is true when the engine is lightly loaded) is then cooler than the water. This cooling effect, plus the rejection of heat directly from the engine and its associated cooling water and lube oil systems by radiation and convection, keeps the engine from overheating at low speed.

Cooling air is blown through the radiators by a pair of fans whose blades are respectively driven by two variable speed 3-phase induction motors. Alternating voltages are applied to these fan motors from the respective outputs of a pair of 3-speed motor drive systems 68 and 69. The inputs of both of the latter drives are connected to the line 32 which in turn is energized by the output of an engine-driven auxiliary alternator, whereby the fundamental frequency of the applied voltages (and hence full speed of the fans) tends to vary with engine speed. Each of the drives 68 and 69 is suitably constructed and arranged to reduce this frequency on command so that the associated fan can run at less than full speed. Separate speed commands for the respective drives are provided by the controller 26 (FIG. 1) over the bus 30 in the form of suitably encoded signals that indicate whether full, reduced, or zero speed is desired. Preferably each fan motor drive comprises the improved "cycle-skipping" speed control system that is disclosed and claimed in U.S. Pat. No. 4,461,985 granted on July 24, 1984, to T. D. Stitt and assigned to General Electric Company, and its controls are programmed to provide both half and quarter speed alternatives to full speed.

While the engine cooling system illustrated in FIG. 2 and described above is a pressurized, dry-radiator type that employs water as the working coolant, persons skilled in the art will understand that other types and other fluids could alternatively be used. In any event, the majority (almost 80%) of the total heat absorbed by the cooling system is transferred directly from the engine to the coolant, and the remainder is transferred first to the lube oil and then through the oil cooler 50 to the coolant. The speeds of the two radiator fan motors are suitably changed as a function of the coolant temperature (as detected by the sensor 62) so as to maintain this temperature in a normal range of approximately 180 to 200 degrees Fahrenheit (F.) under most conditions.

Figure 3:
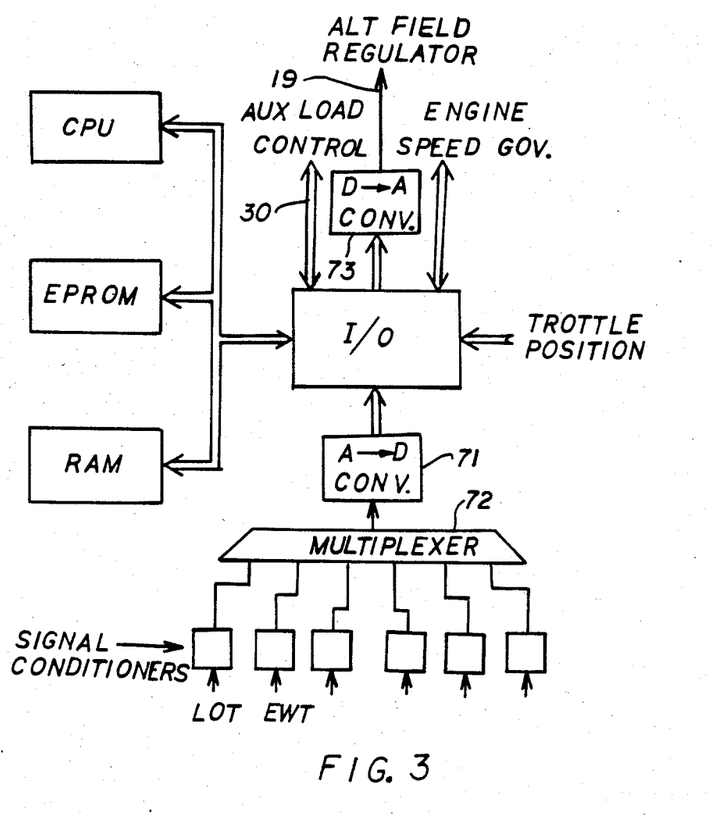
FIG. 3 is an expanded block diagram of the controller (shown as a single block in FIG. 1) which produces output signals for respectively controlling the rotational speed of the engine, the field excitation of the alternator, and the energization of certain auxiliary electrical loads.

In the presently preferred embodiment of the invention, the controller 26 comprises a microcomputer. Persons skilled in the art will understand that a microcomputer is actually a coordinated system of commercially available components and associated electrical circuits and elements that can be programmed to perform a variety of desired functions. In a typical microcomputer, which is illustrated in FIG. 3, a central processing unit (CPU) executes an operating program stored in an erasable and electrically reprogrammable read only memory (EPROM) which also stores tables and data utilized in the program. Contained within the CPU are conventional counters, registers, accumulators, flip flops (flags), etc., along with a precision oscillator which provides a high-frequency clock signal. The microcomputer also includes a random access memory (RAM) into which data may be temporarily stored and from which data may be read at various address locations determined by the program stored in the EPROM. These components are interconnected by appropriate address, data, and control buses. In one practical embodiment of the invention, an Intel 8086 microprocessor is used.

The other blocks shown in FIG. 3 represent conventional peripheral and interface components that interconnect the microcomputer and the external circuits of FIG. 1. More particularly, the block labeled "I/O" is an input/output circuit for supplying the microcomputer with data representative of the selected throttle position and with digital signals representative of the readings of the various voltage, current, speed, pressure, and temperature sensors associated with the locomotive propulsion system. The latter signals are derived from an analog-to-digital converter 71 connected via a conventional multiplexer 72 to a plurality of signal conditioners to which the sensor outputs are respectively applied. The signal conditioners serve the conventional dual purposes of buffering and biasing the analog sensor output signals. As is indicated in FIG. 3, the input/output circuit also interconnects the microcomputer with the auxiliary load controls (via the multiline bus 30), the engine speed governor, and a digital-to-analog signal converter 73 whose output is connected via the line 19 to the alternator field regulator.

The controller 26 is programmed to produce, on the line 19, a control signal having a magnitude that normally depends on the throttle position selected by the locomotive operator. The manner in which this is accomplished is functionally illustrated in FIG. 4 which will now be briefly described. The throttle position data that the controller receives from the trainline 28 (FIG. 1) are fed to a "decoder" functional block 87 which translates this data into appropriate binary numbers on dual output channels 88 and 89. The number on the first channel 88 corresponds to the optimum amount of power that the engine 11 of a particular locomotive can develop per powered axle at whatever engine speed is being requested by the throttle 27, whereas the number on the second channel 89 establishes the nominal voltage (and current) limit of the traction alternator 12 for the same locomotive and the same throttle position. In accordance with conventional practice, the common voltage and current limits on the channel 89 do not change proportionately to the eight discrete throttle positions. Instead, they are scheduled so that the largest increment of tractive effort is allowed as the throttle handle advances from notch 1 to notch 2, and the smallest increment is realized from notch 7 to notch 8. This will contribute to better wheelslip control as the locomotive accelerates from rest.

The throttle-dependent data from the decoder function 87 are supplied, via the respective channels 88 and 89, to a "deration" functional block 90 which processes such data in accordance with programmed routines that respond to additional data received from other sources. The additional data include: the lube oil temperature indicating signal LOT from the temperature sensor 53 (FIG. 2); the engine cooling water temperature indicating signal EWT from the temperature sensor 62 (FIG. 2); a load control signal LCS derived from the engine speed governor system 25 (normally LCS has a value of one on a per unit basis, but it will decrease whenever a reduction of traction power is necessary to enable the engine to maintain its called-for speed); "AUX HP" datum derived from the controls of the auxiliary load equipment 31 (FIG. 1) to indicate the amount of power per axle that the auxiliary loads of the locomotive are actually using; and relevant data from other selected inputs, as represented in FIG. 4 by the block 91 labeled "other." More details of the deration function 90 are illustrated in FIG. 5 which will soon be described.

Figure 4:
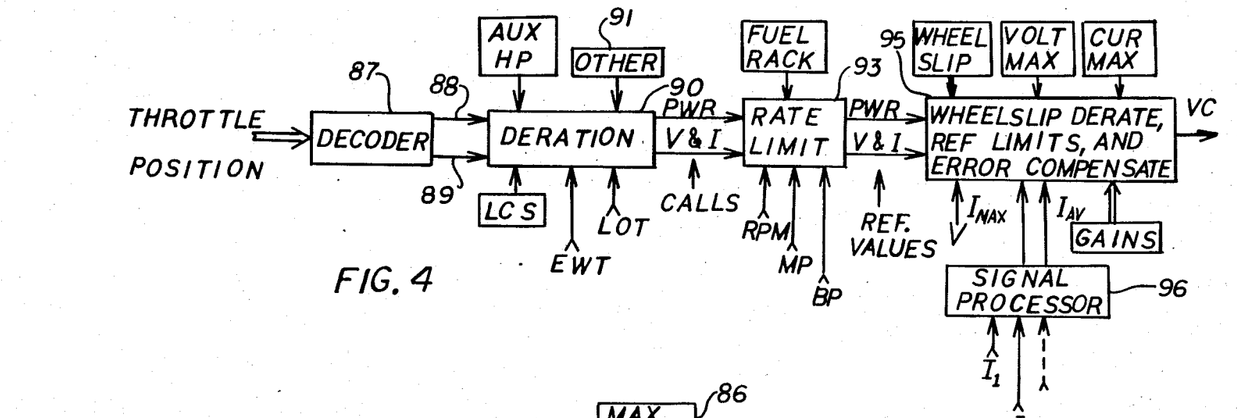
FIG. 4 is a diagram of an "equivalent circuit" that is used to illustrate the manner in which the alternator field excitation control signal is produced by the controller shown in FIG. 3.
Figure 5:
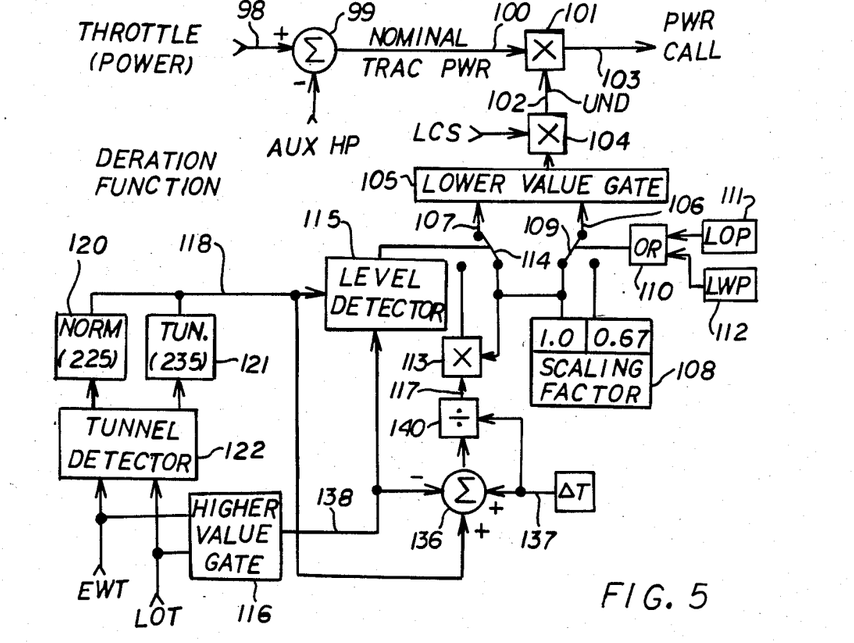
FIG. 5 is another "equivalent circuit" that is used to illustrate the deration function shown as a signal block in FIG. 4.

As is shown in FIG. 4, the deration function has first and second output channels, labeled "PWR" and "V & I," respectively. A number representing the called-for power output (KVA) of the main traction alternator per powered axle of the locomotive is provided on the first channel, and a number representing the called-for voltage (and current) limit is provided on the second channel. Under normal operating conditions and assuming no change in auxiliary power, such data track the data on the decoder output channels 88 and 89, respectively. But in response to certain temporary abnormal conditions, as indicated by the values of the signals LOT, EWT and LCS and the data provided by its other inputs, the deration function 90 modifies the throttle-dependent data and calls for a reduced amount of traction power and a lower voltage and current limit.

The call data from the deration function 90 are respectively supplied to dual channels of a "rate limit" functional block 93 in which such data are processed in accordance with programmed routines that respond to additional data received from other sources. The additional data include: the engine speed signal RPM; the combustion air pressure indicating signal MP from the pressure sensor 40 connected to the engine air intake manifold 39 (FIG. 2); the ambient air pressure signal BP from the barometric pressure sensor 29 (FIG. 1); and "fuel rack" datum derived from the engine governor or fuel system to indicate the displacement of the fuel pump rack and hence the amount of fuel that is actually being supplied to the engine. The rate limit function 93 has first and second output channels, labeled "PWR" and "V & I," respectively. A number representing a reference value of traction power per axle is provided on the first channel, and a number representing a reference value of the common voltage and current limit is provided on the second channel. Under steady state conditions, such reference data are the same, respectively, as the call data on the corresponding output channels of the deration function 90. But in the event of a step change in the call data, the rate limit function 93 prevents the reference data from changing faster than a desired maximum rate. In the case of the power reference, it is additionally effective to control the rate of change as a function of the speed and horsepower of the engine when more power is called for.

As can be seen in FIG. 4, the reference values on the output channels of the rate limit function 93 are respectively supplied to first and second inputs of a block 95 labeled "wheelslip derate, ref limits, and error compensate." This block receives additional data from other sources, including: "WHEELSLIP" data indicating that either a small or a moderate power reduction is required to correct a wheelslip condition and thus restore wheel-rail adhesion; "VOLT MAX" and "CUR MAX" data that establish absolute maximum limits for the alternator output voltage and current, respectively; and "GAINS" data that depend on the throttle position and other parameters of the locomotive and its controls. It also receives two output signals IAV and IMAX from a signal processor 96 and the voltage feedback signal V that represents the average magnitude of the rectified alternator output voltage. The processor 96 receives as inputs the traction motor armature current feedback signals I1, I2, etc.; it is so constructed and arranged that the value of IMAX is determined by the input signal of highest magnitude and the value of IAV corresponds to the average magnitude of all of the traction motor currents.

The block 95 is multifunctional. In the course of executing the alternator excitation control program, the reference values at the first and second inputs of the block 95 are modified or derated when a wheelslip condition is detected. The PWR reference input is further modified as a function of any appreciable power unbalance among the various traction motors of the locomotive so as to provide a desired traction power value that differs from this input when necessary to correct for such unbalance. The common V & I reference input is deployed to provide separate voltage and current reference values that jointly vary with this input but that have different maximum limits, as established by the VOLT MAX and CUR MAX inputs, respectively.

In other routines carried out in the block 95, the limited current reference value is compared with the actual value of the maximum current signal IMAX to derive a current error value equal to their difference, the limited voltage reference value is compared with the actual value of the alternator voltage feedback signal V to derive a voltage error value equal to their difference, and the desired power value is compared with the actual KVA of the most loaded traction motor, as found by multiplying IMAX by V, to derive a power error value equal to their difference. The three error values are processed in accordance with programmed compensation routines to derive power, voltage, and current control values that are respectively representative of the power, voltage, and current error values. The compensation routines introduce proportional plus integral transfer functions, the respective gains of which are determined by the GAINS data. Thus each control value varies as a function of the time integral of its associated error value. All three of the control values are supplied to a least value gate in the multifunctional block 95. From the least value gate an output signal VC is derived, and accordingly the value of VC corresponds to the smallest control value.

The value of VC determines the magnitude of the analog control signal that the controller 26 supplies, via the line 19, to the alternator field regulator 17 (FIG. 1). The field regulator will respond to the latter signal by varying the field strength of the traction alternator as necessary to minimize any difference between the value of the voltage feedback signal V and the value of the output signal VC. So long as both V and IMAX are within the limit set by the common V & I reference input to the block 95 and are not above their respective maximum limits as established by VOLT MAX and CUR MAX, the value of VC is determined by the power control value which will now be smaller than either the voltage or current control value. Consequently the alternator output voltage is maintained at whatever level results in essentially zero error between actual and desired traction power. But if V (or IMAX) tends to exceed its limited reference value, the voltage (or current) control value is driven lower than the power control value and the value of VC accordingly decreases, whereby the alternator voltage is adjusted to whatever level results in zero error between V (or IMAX) and the limited reference value of voltage (or current).

As was briefly explained hereinbefore, the alternator excitation control program that is depicted in FIG. 4 includes as one of its steps or routines the deration function 90. The latter function can be better understood with the aid of FIG. 5 which is a simplified illustration of some of the steps performed by the microcomputer to derate the requested power data that the block 90 receives from the output channel 88 of the decoder 87 (FIG. 4). In FIG. 5 this throttle-dependent binary number is fed on a line 98 to a summing point 99 where a number corresponding to the actual auxiliary power demand (on a per axle basis) is subtracted from it. The net output of the summing point 99 is processed by a series of additional steps (omitted in FIG. 5) to provide, on a line 100, a binary number that corresponds to the nominal per axle power output of the main traction alternator for the selected throttle position. To reduce this number when deration is desired, it is in effect multiplied by a second number which, on a normalized basis, can vary between 1 and 0.

The multiplication process is symbolically illustrated in FIG. 5 by a block 101 labeled "X" having two input lines 100 and 102 and an output line 103 which is equivalent to the previously-mentioned first output channel of the deration function 90. The aforesaid second number, which is supplied to the multiplying function 101 via the line 102, is referred to hereinafter as a deration signal UND. It is actually the complement of the desired amount of deration: when UND=1, there is no deration and the traction power call data on output line 103 is 100% of the nominal traction power represented by the binary number on the line 100; but when UND=0, 100% deration is obtained and zero traction power is called for.

The deration signal UND on the line 102 is obtained from the output of another multiplying function 104, the two inputs to which respectively comprise the load control signal LCS from the engine speed governor system 25 and the output of a "lower value gate" function 105. As previously indicated, the signal LCS has a quiescent value of 1 on a per unit basis, but if the governor determines that a traction power reduction were needed in order for the engine to maintain its commanded speed, the value of LCS will be only an appropriate fraction of 1. The output of the gate 105 is the smaller of two values that are respectively supplied to its inputs 106 and 107. The value of the first input 106 is either 1.0 or 0.67 (on a per unit basis), depending on which of two predetermined outputs of a "scaling factor" block 108 is selected. The selection process is represented in FIG. 5 by a bistable switch 109 controlled by an OR logic function 110. Normally this switch is in its left-hand position so that the value of the input 106 is 1.0. Alternatively, if there were abnormally low pressure either in the engine lube oil system 22 (as signalled by a low oil pressure detector 111) or in the cooling water system 23 (as signalled by a low water pressure detector 112), the OR logic 110 changes the state of the switch 109 so that the value of the first input 106 would be only two-thirds or 0.67 per unit.

The value of the second input 107 to the lower value gate 105 of the deration function is either unity or a fraction thereof, depending on whether the 1.0 output of the scaling factor block 108 is supplied to this input directly or via a multiplying function 113. This choice is represented in FIG. 5 by another bistable switch 114 controlled by a "level detector" function 115 which in turn is responsive to either the lube oil temperature signal LOT or the engine water temperature signal EWT, as determined by a "higher value gate" function 116. Assuming that neither temperature signal has an abnormally high value, the level detector 115 maintains the switch 114 in its right-hand position so that the value of the input 107 to the gate 105 is 1.0. In this event, so long as the oil and water pressures are not abnormally low, the output of the gate 105 is 1, and consequently the derate signal UND on line 102 will be the same as the load control signal LCS. However, if either the lube oil temperature or the engine water temperature were to rise above a predetermined overtemperature threshold, the level detector 115 will change states which in effect moves the switch 114 to a derate position so that the value of the second input 107 is the product of 1 and a number supplied to a second input line 117 of the multiplier 113. (Although omitted in FIG. 5, an additional step is preferably performed on this product to reduce it by a predetermined percentage if an abnormal accumulation of dirt is detected in the locomotive air filters 37.) As will soon be explained, the number on the multiplier input line 117 will be some fraction of 1. As a result, so long as the first input 106 is not lower than the latter number, the derate signal UND on the line 102 now equals the product of the number on line 117 and the value of LCS.

The level detector function 115 is programmed to change to its derate state whenever the higher one of the two temperature signals LOT and EWT attains a value equal to a predetermined boundary value on a line 118. Under most operating conditions, the temperature boundary value on line 118 will be set at a first level by a normally activated block 120 labeled "NORM (225)." This level corresponds to the normal overtemperature threshold (e.g., approximately 225° F.). However, a higher threshold is desirable and feasible while the locomotive is passing through a tunnel. In this event, in accordance with one aspect of the present invention, the block 120 is deactivated and another block 121 is activated to increase the temperature boundary value on line 118 to a second level corresponding to an overtemperature threshold of approximately 235° F. which is about 10° above the aforesaid normal threshold. The selection of these two different boundary values is controlled by a "tunnel detector" function 122.

In accordance with another aspect of the present invention, the tunnel detector function receives as inputs the temperature signals LOT and EWT, and it is programmed automatically to shift the temperature boundary value on line 118 from its preset normal level to the higher tunnel level whenever the value of EWT indicates that water temperature exceeds a predetermined above-normal magnitude (e.g., approximately 215° F.) and also is higher than a reference level determined by the lube oil temperature. Preferably the reference level equals the lube oil temperature.

When the locomotive engine is running outside a tunnel and the air that the 3-speed motor driven fans are blowing across the radiators 65, 66 is not unusually hot, the cooling water temperature (as detected by. the sensor 62) is normally maintained in a predetermined range (e.g., 180°-200° F.) below the boiling point of water at sea level, and the lube oil temperature (as detected by the sensor 53) will be approximately 10° to 25° hotter than the water temperature. However, when a train enters a relatively long tunnel the exhaust gases of the engine on the lead unit of the consist will appreciably raise the ambient temperature in the confined space between the locomotive and the tunnel walls and ceiling, and the temperature of the air blown across the radiators on the trail units soon approaches the temperature of the water in these radiators. As a result the radiators stop functioning effectively, the engine is inadequately cooled, and both the water and lube oil get hotter. Although lubricating oil has about half the specific heat capacity as the coolant in the cooling system of a locomotive and therefore absorbs heat more readily than an equal mass of the coolant, we have found that the water temperature actually rises at a much faster rate than the lube oil temperature in a tunnel. This is because the engine rejects three to four times more heat to the coolant than to the lubricant. Once a trail unit enters a tunnel, it takes less than two or three minutes for the water temperature to increase to approximately 115% of its pre-tunnel level and to overtake the more slowly rising oil temperature. Ordinarily the crossover temperature will be at least 5° lower than the overtemperature threshold at which deration is normally initiated. By sensing the fact that water temperature has exceeded a reference level determined by the lube oil temperature, the tunnel detector 122 can accurately indicate that the locomotive is in a tunnel.

Figure 6:
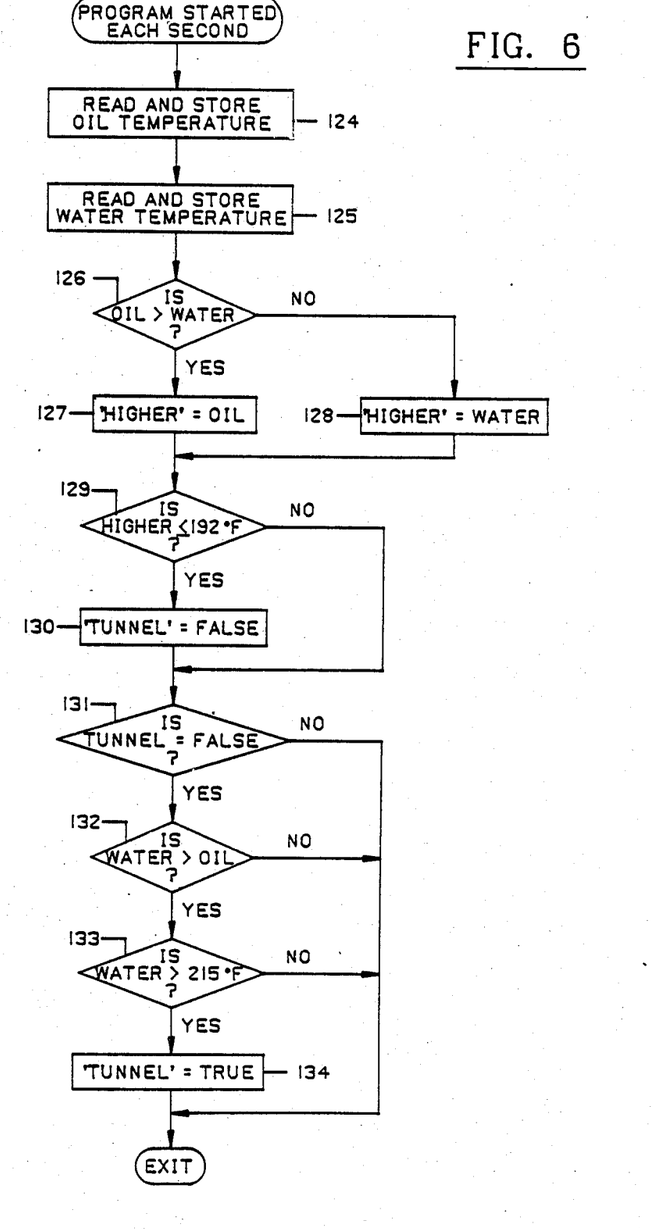
FIG. 6 is a flow chart that explains the operation of the preferred embodiment of the tunnel detector function illustrated in FIG. 5.

In the presently preferred embodiment of the invention, the tunnel detecting function is implemented by programming the microcomputer to execute the routine that is illustrated in FIG. 6. This routine is repeated 60 times a minute. It starts with a step 124 of reading and storing the magnitude of the signal LOT which is a measure of the temperature of the lube oil flowing out of the engine. This step is followed by a similar step 125 of reading and storing the magnitude of the signal EWT which is a measure of the temperature of the engine coolant in a hot water section of the cooling system. Upon completing step 125, the routine proceeds to an inquiry point 126 which determines whether or not the stored magnitude of oil temperature is higher than the stored magnitude of water temperature. If the answer is affirmative, the next step 127 is to load the stored oil temperature into a "higher temperature" register, whereas if the answer were negative, the next step 128 would be to load the stored water temperature into the same register.

Once the higher temperature register is loaded, the FIG. 6 routine proceeds to another inquiry point 129 which tests whether or not the higher temperature is equal to or less than a first predetermined magnitude that preferably is in the normal range of temperature. Whenever the higher temperature equals or is less than this magnitude, step 129 is followed immediately by a step 130 that sets the tunnel flag in a "false" state. It will be apparent that the latter step is effective after the locomotive passes through a tunnel to reset the tunnel detector function 122 as soon as the oil or water (whichever is hotter) cools down to the first temperature magnitude determined at inquiry point 129. A third inquiry point 131 follows the flag-setting step 130. Alternatively, the routine jumps directly from inquiry point 129 to the point 131 if the higher temperature exceeds the predetermined first magnitude.

The third inquiry point determines whether or not the tunnel flag is in its false state. This is the last step in the routine if the answer is negative, which is the case when a tunnel has been detected. Otherwise the routine proceeds to yet another inquiry point 132 which compares the stored water temperature with the stored oil temperature. So long as the water is not hotter than the oil, the routine exits here. Otherwise a final inquiry is made at a point 133 to decide whether or not the stored water temperature is more than a second predetermined magnitude (e.g., 215° F.) which is higher than the normal steady state range of water temperature but lower than the overtemperature threshold at which deration is normally initiated. In response to a negative answer at point 133, the routine exits. On the other hand, if the stored water temperature exceeds the second predetermined magnitude, the next and final step 134 in the FIG. 6 routine is to set the tunnel flag in a "true" state, thereby indicating that the locomotive is in a tunnel. In effect this changes the temperature boundary value on line 118 in the deration function 90 (FIG. 5) from its preset normal level to the second higher level for the relatively short time the locomotive is in the tunnel.

Returning now to the description of FIG. 5, the temperature boundary value on the line 118 is fed to a summing junction 136 that has two additional input lines 137 and 138. The line 137 supplies it with a predetermined fixed value that corresponds to a maximum permissible deration temperature excursion or "delta" (e.g., 10° F.). The input line 138 supplies the junction 136 with the output value of the gate 116 (i.e., the value of either the lube oil temperature signal LOT or the engine water temperature signal EWT, whichever is higher). As is illustrated in FIG. 5, the latter value is subtracted from the sum of the temperature boundary value on line 118 and the fixed value on line 137, and the remainder is supplied to a normalizing function 140 where it is divided by the predetermined fixed value on the line 137. The normalized output of the function 140 is supplied to the second input line 117 of the multiplying function 113. Once the overtemperature-responsive deration function is initiated in response to the higher one of the temperature signals LOT and EWT (and hence the value on line 138) increasing beyond the selected temperature boundary value on line 118, the number on line 117 and hence the second input 107 to the lower value gate 105 will be a number less than 1, i.e., a fraction of 1. This fraction decreases from 1 to 0 as the value on line 138 increases from the selected boundary value to a value that exceeds it by the predetermined fixed value on line 137. This causes the derate signal UND on line 102 to correspondingly decrease (assuming LCS=1), and consequently the power call data on the line 103 is progressively reduced from 100% of nominal traction power to zero. The resulting deration is illustrated graphically in FIG. 7.

Figure 7:
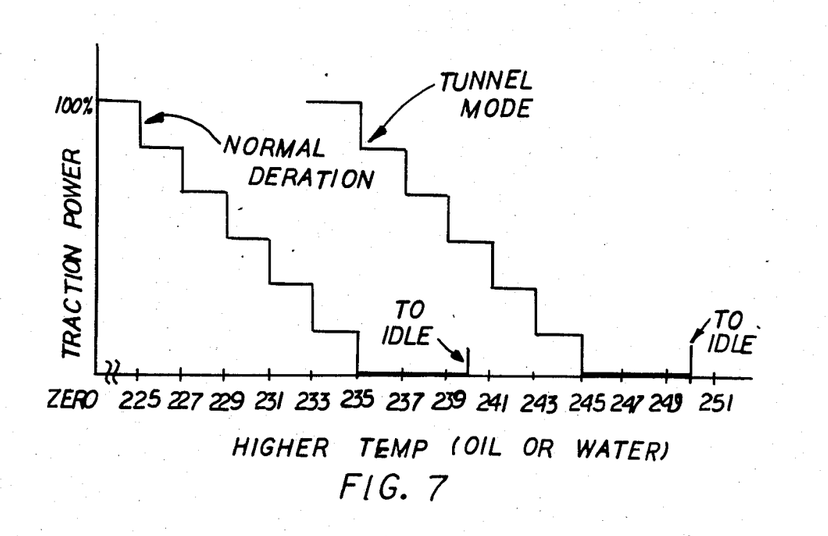
FIG. 7 is a graph of horsepower vs. temperature to illustrate the deration response to an overtemperature condition, both normally and in a tunnel.

As is shown in FIG. 7, deration initially becomes effective when either the water temperature or the oil temperature rises above the preset first or normal overtemperature threshold (225° F.), and it proceeds through a series of increasingly effective steps as the higher temperature continues to increase. In practice there is actually one step for each degree of temperature increment, and each step can reduce the power call an additional 10% of its nominal value. Full deration (zero traction power) is obtained if and when the higher temperature attains a level that exceeds the normal overtemperature threshold by the aforesaid predetermined delta (e.g., 10° F.). After all traction power is removed, if the higher temperature continues to increase to a predetermined high magnitude (e.g., 240° F.), the engine is automatically commanded to run at idle speed regardless of the position of the throttle.

FIG. 7 also shows that after a tunnel is detected, normal deration is suppressed or delayed until either the cooling water temperature or the lube oil temperature attains the second, higher overtemperature threshold (e.g., 235° F.). Once initiated, the tunnel mode of deration proceeds as before, with full deration (zero traction power) being obtained if and when the higher temperature reaches a level that exceeds the tunnel threshold by the same temperature delta. If the higher temperature continues to increase to an even higher overtemperature magnitude (e.g., 250° F.), the engine speed command is reduced to its idle value. By automatically increasing the threshold at which overtemperature deration is initiated in a tunnel, the locomotive is allowed to run longer with full traction power, thereby improving its performance. Even one extra minute of full power is beneficial. The higher temperatures that are consequently developed in the engine and other components of the propulsion system are within the short time ratings thereof and can be safely tolerated so long as the locomotive is not in the tunnel too long. Preferably the deration function includes means (not shown) for cancelling the tunnel mode of deration and reverting to normal deration in response to the higher temperature remaining above the tunnel threshold for more than a predetermined period of time (e.g., 10 minutes).

The controller 26 (FIGS. 1 and 3) is suitably programmed to impose certain temperature-responsive restraints or limits on the engine speed command signal that it provides for the governor system 25. Under normal propulsion conditions the value of this signal varies with the engine speed selected by the locomotive operator, as indicated by the throttle-position signal that the controller receives over the trainline 28. But if the temperature of either the lubricant or the coolant (as indicated by the signals LOT and EWT, respectively) rises above the first-mentioned high magnitude (240° F.) after normal deration or above the higher predetermined magnitude (250° F.) in a tunnel, the controller calls for idle speed regardless of the position of the throttle handle 27. This engine speed limit function can be better understood with the aid of FIG. 8 which illustrates that a throttle position indicating signal on an input line 76 is fed to an "idle override" functional block 77. The output of the block 77 is throttle request data. Normally the throttle request is the same as the throttle position, but whenever the throttle position equals "idle," the signal on line 76 is modified by the idle override function, and the throttle request is then a function of the value of the engine water temperature indicating signal EWT.

Figure 8:
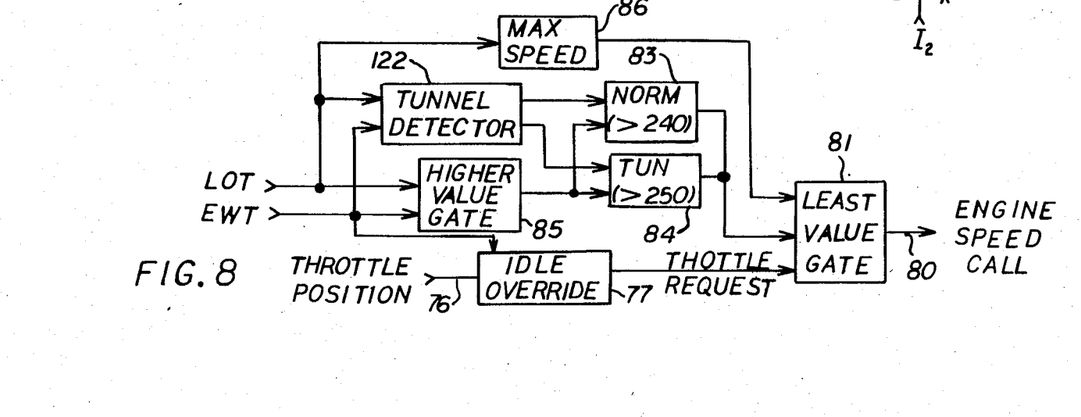
FIG. 8 is a diagram of an "equivalent circuit" that is used to illustrate another feature of the controller shown in FIG. 3.

As is indicated in FIG. 8, the throttle request from the idle override block 77 is fed to an engine speed call line 80 via an auctioneering functional block 81 labeled "least value gate" where it is compared with two additional inputs so that the actual value of the speed command signal is the same as the input of lowest value. One of the additional inputs to the gate 81 is provided by a "maximum speed" functional block 86 which in turn is responsive to the temperature of the engine lube oil (LOT). This input has a high value under normal operating conditions, but its value is reduced to a number corresponding to a limited engine speed if LOT indicates that the lubricating oil is relatively cool.

The other additional input to the least value gate 81 is provided by dual sources 83 and 84. Normally both of these sources are inactive, in which state they provide an input of high value for the gate 81. But if either one of the sources 83 and 84 is activated, the value of this input is reduced to a number corresponding to idle speed. The source 83 is automatically activated when the tunnel detector function 122 indicates that the locomotive is not in a tunnel (i.e., the tunnel flag of the FIG. 6 routine is in its "false" state) and either LOT or EWT (whichever is higher) increases to a value corresponding to the first-mentioned high temperature magnitude (240° F.). Alternatively, the second source 84 is activated when the tunnel detector function 122 indicates that the locomotive is in a tunnel (i.e., the tunnel flag is set in its "true" state) and the higher temperature attains the aforesaid higher predetermined magnitude (250° F.). The higher value of the two temperature signals LOT and EWT is determined by a "higher value gate" function 85. Whenever either one of the sources 83 and 84 is activated, the speed command signal on line 80 is restricted to its idle value.

While a preferred embodiment of the invention has been shown and described by way of example, many modifications will undoubtedly occur to persons skilled in the art. The concluding claims are therefore intended to cover all such modifications as fall within the true spirit and scope of the invention.

What is claimed is:

1. A tunnel detector for a locomotive having an onboard thermal prime mover which is cooled by a coolant and lubricated by lube oil, the temperature of said coolant being lower than a predetermined magnitude under normal operating conditions of the locomotive, comprising:
    a. means for sensing the temperature of the coolant;
    b. means for sensing the temperature of the lube oil; and
    c. means connected to both of said temperature sensing means for automatically indicating that the locomotive is in a tunnel if the sensed coolant temperature is above said predetermined magnitude and is higher than a variable reference level determined by the sensed lube oil temperature.

2. The tunnel detector as in claim 1, in which said reference level equals the actual lube oil temperature.

3. The tunnel detector of claim 1 for a locomotive in which the prime mover coolant circulates through a lube oil cooler and through a plurality of radiators across which air is blown by variable-speed fans which are suitably controlled to maintain the coolant normally in a predetermined temperature range.

4. The tunnel detector of claim 3 for a locomotive the prime mover coolant of which is normally maintained in a temperature range of approximately 180° to 200° F.

5. The tunnel detector of claim 3 for a locomotive the prime mover of which is a diesel engine.

6. In a locomotive having a propulsion system comprising a thermal prime mover which is cooled by a coolant and lubricated by lube oil, the temperature of said coolant being lower than a predetermined magnitude under normal operating conditions of the locomotive, electric power generating means mechanically driven by the prime mover, a plurality of traction motors supplied with electric current from the generating means, a controller for providing a variable excitation control signal, and controllable excitation means responsive to the value of the control signal for regulating the power output of the generating means, the controller including a deration function which is effective in response to the temperature of the prime mover rising to a predetermined overtemperature threshold to reduce the value of the control signal and thereby reuuce the power output of the generating means, the improvement comprising;
 a. first means for sensing the temperature of the coolant;
 b. second means for sensing the temperature of the lube oil;
 c. third means associated with the controller and connected to said first and second means for automatically indicating that the locomotive is in a tunnel if the sensed coolant temperature is above said predetermined magnitude and is higher than a variable reference level determined by the sensed lube oil temperature; and
 d. fourth means responsive to the indication that the locomotive is in a tunnel for increasing the overtemperature threshold at which the deration function becomes effective.

7. The improvement of claim 6 for a locomotive in which the deration function, once effective, progressively reduces the control signal value as a function of the degree of overheating.

8. The improvement as in claim 6, in which the deration function becomes effective normally when the temperature of either the coolant or the lube oil, whichever is hotter, attains an overtemperature threshold equal to a first preset level, and in which said fourth means raises the overtemperature threshold to a second higher level.

9. The improvement as in claim 8, in which said first level is approximately 225° F. and said second level is approximately 235° F.

10. The improvement as in claim 8, in which the deration function, once effective, progressively reduces the control signal value as a function of the degree of prime mover overheating.

11. The improvement as in claim 6 for a locomotive including means for regulating the operating speed of the prime mover in response to a variable command signal provided by the controller, the controller being so arranged that the value of the speed command signal is normally determined by associated throttle means (which has an idle speed setting as well as multiple power settings) but is automatically restricted to a value corresponding to idle speed whenever the temperature of either the coolant or the lube oil, whichever is hotter, attains a predetermined high overtemperature magnitude, in which the improvement further comprises fifth means associated with the controller and responsive to the indication that the locomotive is in a tunnel for increasing the overtemperature magnitude to which the coolant or lube oil temperature has to rise before the speed command signal is restricted to its idle value.

* * * * *